United States Patent
Jakob et al.

(10) Patent No.: US 6,666,721 B1
(45) Date of Patent: Dec. 23, 2003

(54) IGNITION MECHANISM FOR A RESTRAINING DEVICE IN A VEHICLE

(75) Inventors: Gert Jakob, Stuttgart (DE); Werner Nitschke, Ditzingen (DE); Thomas Wiesa, Vaihingen (DE); Ulrich Goebel, Reutlingen (DE); Albert-Andreas Hoebel, Reutlingen (DE); Stefan Rupprecht, Tomioka (JP); Martin Zywietz, Ludwigsburg (DE); Peter Schaedler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/807,156

(22) PCT Filed: Jul. 15, 1999

(86) PCT No.: PCT/DE99/02200

§ 371 (c)(1),
(2), (4) Date: Jul. 9, 2001

(87) PCT Pub. No.: WO00/20262

PCT Pub. Date: Apr. 13, 2000

(30) Foreign Application Priority Data

Oct. 7, 1998 (DE) .......................................... 198 46 110

(51) Int. Cl.$^7$ .............................................. H01R 13/66

(52) U.S. Cl. .................... 439/620; 102/202.9; 439/680; 439/862

(58) Field of Search ................................. 439/700, 620, 439/680, 862; 102/202.9, 202.2, 202.12, 202.14, 202.3, 202.4

(56) References Cited

U.S. PATENT DOCUMENTS

| | | | | |
|---|---|---|---|---|
| 5,054,395 A | * | 10/1991 | Vetter et al. ............. | 102/202.3 |
| 5,327,834 A | | 7/1994 | Atkeson ................... | 102/202.9 |
| 6,227,115 B1 | * | 5/2001 | Gruber et al. ........... | 102/202.9 |

FOREIGN PATENT DOCUMENTS

| DE | 35 37 820 | 4/1987 |
|---|---|---|
| DE | 196 10 799 | 9/1997 |

* cited by examiner

Primary Examiner—Neil Abrams
(74) Attorney, Agent, or Firm—Kenyon & Kenyon

(57) ABSTRACT

An easily producible and easily installable ignition mechanism for restraint devices in a vehicle includes an ignition capsule, in which at least one ignition element and its contact pins are fixed. Into the ignition capsule a pedestal can be set, in which a carrier arrangement having circuit elements is arranged. Spring elements are present, by which contact is established between circuit elements and contact pins of the ignition element when the pedestal is set into the ignition capsule.

6 Claims, 2 Drawing Sheets

IGNITION MECHANISM FOR A RESTRAINING DEVICE IN A VEHICLE

FIELD OF THE INVENTION

The present invention relates to an ignition mechanism for a restraining device in a motor vehicle, which includes at least one ignition element and circuit elements positioned on support means, preferably for the supplying power for the triggering and/or diagnosis of the ignition element, contact pins connected to the ignition element making the electrical connection to the circuit elements.

1. Background Information

Such an ignition device is described in German Patent No. 196 10 799. This ignition mechanism is conceived so as to have the smallest possible outer dimensions, compared to ignition mechanisms deployed up to this point, so that it can even be accommodated in the steering wheel of a vehicle. In previous methods, the ignition element and an ignition power module which contained circuitry for power supply and/or diagnosis of the ignition element have been accommodated in separate modules contactable via plug connectors. According to German Patent No. 196 10 799, a module housing includes, besides an ignition element generating the thermal energy for igniting an ignition mixture, a circuit element, for instance, for supplying power, for triggering and/or diagnosis of the ignition element. For that purpose, in the module housing, beneath the ignition element, there is a rectangular shaped body in which contact pins for the ignition element are integrated, and on whose sidewalls circuit elements are applied. The rectangular shaped body is used also, both for positioning the contact pins for the ignition element and as a carrier for the circuit elements.

2. Summary of the Invention

An ignition device which is simple to manufacture from a manufacturing technique point of view, and which is easy to handle from an assembly technique point of view is provided. According to this, at least one ignition element and its contact pins are fixed in a capsule. Support means for the switching elements are placed in order on a plug mounting (pedestal) which can be inserted into the capsule. In addition, spring elements are present, which make contact between the circuit elements and the contact pins of the ignition element when the plug mounting is inserted into the capsule. According to the present invention, the ignition device includes two components. One is the capsule with at least one ignition element and appertaining contact pins, and the other is the plug mounting in which the circuit elements are located. The advantage of this division of the ignition device into two parts is, that each part, namely, on the one hand the capsule with the ignition element, and on the other hand the pedestal with the circuit elements, can be manufactured and tested separately. Then the pedestal with the circuit elements can be delivered to various customers for final mounting with the ignition element capsule.

The support means for the circuit elements can be made of at least one substrate, running transversely to the contact pins, whose upper and/or lower side are equipped with circuit elements.

The connecting pins are expediently fixed in the plug mounting, contacting circuit elements at one end, and being brought out of the ignition device at the other end, so that they may be brought into contact with a connecting plug.

On the side of a substrate facing the contact pins of the ignition element, contact surfaces can be provided, on which the spring elements may rest.

In the plug mounting at least one opening can be provided for receiving at least one circuit element. At least one connecting pin embedded in the plug mounting is used to make an electrical connection between this circuit element and one or more other circuit elements. On the plug mounting, the connecting pin is preferably brought out to the outside, and the part of the connecting pin brought out of the plug mounting is extrusion-coated with an insulating plastic. The extrusion-coated connecting pin can be used as an anti-rotation element when plugging the ignition device into a connecting socket.

DETAILED DESCRIPTION

Figure 1:
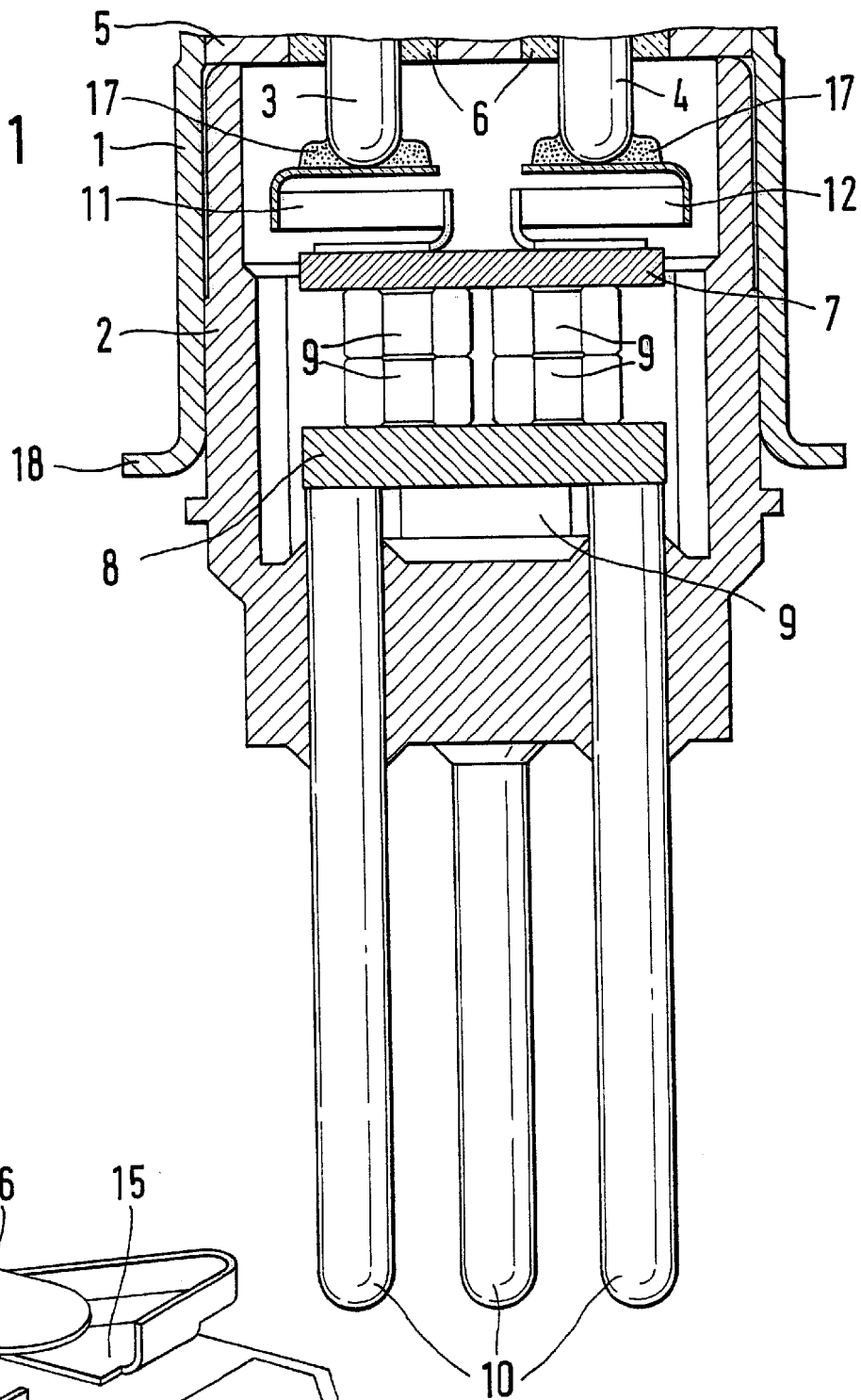
FIG. 1 shows a longitudinal section through an ignition device having substrates arranged one above another for circuit elements.

As can be seen from the longitudinal cross-section through an ignition device illustrated in FIG. 1, the device includes an ignition capsule 1 and a plug mounting 2 which can be inserted into it. The ignition capsule 1, in a known way, contains one or a plurality of ignition elements) which can be designed, for example, as resistance wires, and are in communication with an ignitable substance. The interior of the ignition capsule is not shown in FIG. 1, because the function of such a capsule is known per se, and also is not part of the subject matter of the present invention. The electrical connection to the at least one ignition element is made via contact pins 3 and 4, which traverse the bottom 5 towards the ignition capsule 1. The contact pins 3 and 4 are fixed to openings in the bottom 5 using a glass melt. The projection of capsule 1 rising above bottom 5 is used to receive the already mentioned plug mounting 2.

Figure 3:
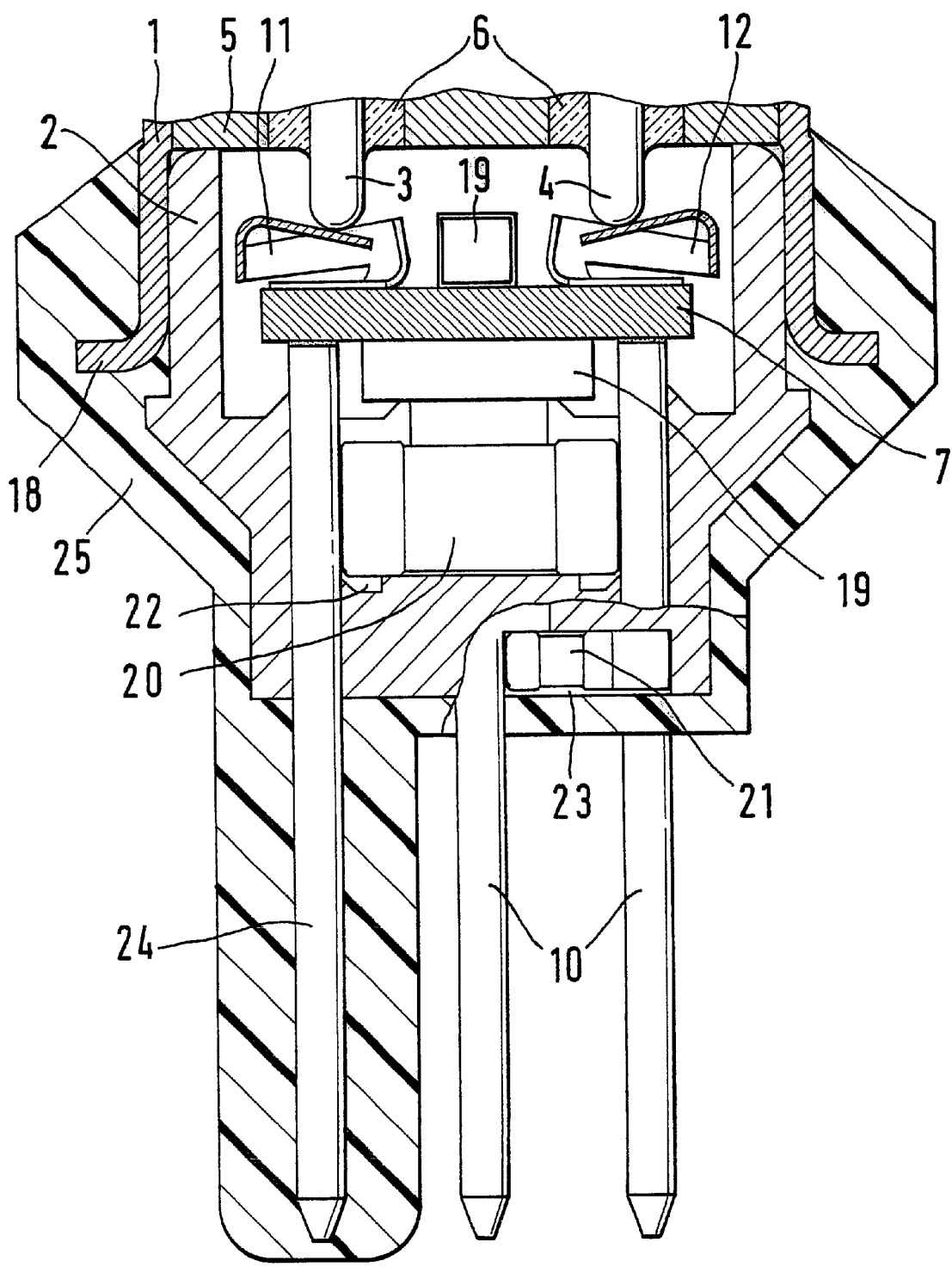
FIG. 3 shows a longitudinal section through an ignition device having switching elements lying in the openings of the plug mounting.

In plug mounting 2, two substrates 7 and 8, running perpendicular to contact pins 3 and 4, are arranged one above the other. These substrates 7, 8 are used as carriers for various switching elements 9, which can be affixed on one or both sides of the two substrates 7, 8. The switching elements 9 are, for example SMD-components or ASIC's in flip-chip technology. The circuit elements are used preferably as power supplies or for triggering and/or diagnosing of the ignition element accommodated in the ignition capsule 1. The circuit elements 9 can also be positioned in another constellation, different from the exemplary embodiment illustrated in FIG. 1. A further example of this is shown in FIG. 3, described below.

Plug mounting 2 is also used as a holding device for a plurality of connecting pins 10, which make contact on the one hand with the circuit elements on the inside of the plug mounting, and on the other hand are brought out of plug mounting 2, so that they can be brought into contact with a connecting plug (not illustrated). In the exemplary embodiment illustrated in FIG. 1, the connecting pins 10 make contact with the lower substrate 8, for example, by contact adhesion or soldering. The electrical connection to the circuit elements on the individual substrates 8 and 7 is made via printed circuit traces on substrates 7, 8, and the electrical connection between the two substrates 7 and 8, as shown, is made by direct contact with SMD-components 9, positioned on the upper side of substrate 8 and on the underside of substrate 7. The connection between the two substrates 7 and 8 can also be made by the connecting pins 10, which are brought from substrate 7 through substrate 8, or by their own contact pins, connecting the two substrates 7 and 8 electrically with each other.

Figure 2:
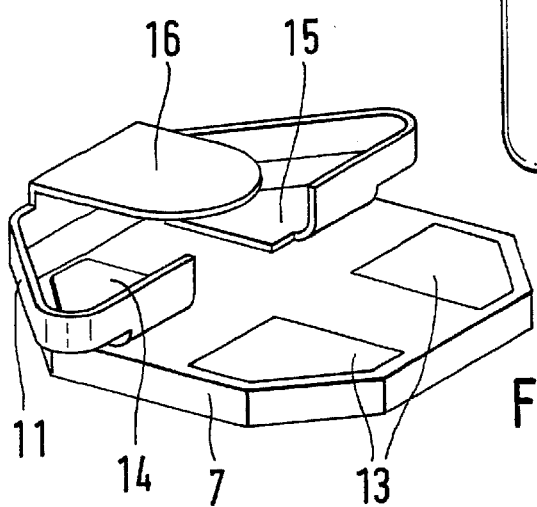
FIG. 2 shows a spring element.

The electrical connection between contact pins 3 and 4 of the ignition element and the circuit elements 9 is made via spring elements 11 and 12. And indeed, for each contact pin 3 and 4, its own spring element 11 or 12, respectively, is provided. A possible refinement of the spring elements is made clearer in the perspective representation of spring element 11 in FIG. 2. Substrate 7 is furnished on its upper side with two contact surfaces 13, one for each spring element 11 or 12, respectively. Each spring element 11, 12 has two contact surfaces 14 and 15, adapted to the contact surfaces 13 on substrate 7. Opposite contact areas 14 and 15 there is an elastic reed 16 at spring element 11. Contact pin 3 or 4 of the ignition element impinges upon reed 16 of spring element 11 or 12, respectively, when plug mounting 2 is inserted into capsule 1. The use of spring elements 11 and 12 compensates for the clearance tolerance between contact pins 3 and 4 and contact surfaces 13 on substrate 7, and produces a reliable electrical connection between contact pins 3, 4 and circuit elements 9 on the substrates 7 and 8. As shown in FIG. 1, the spring elements can be connected to contact pins 3 and 4 by an adhesive or by soldering. An adhesive or soldering connection is also expedient for the contact areas 14, 15 of spring elements 11, 12 to contact surfaces 13 on substrate 7.

After the plug mounting 2 has been placed into capsule 1, a plastic extrusion coat is applied in the area of the lower edge 18 of capsule 1, for the mutual fixing of the two components of the ignition device. This plastic extrusion coat will be discussed below, in connection with FIG. 3.

FIG. 3 shows a further exemplary embodiment of an ignition device. Parts of this ignition device which are the same as those in the exemplary embodiment in FIG. 1 have been given the same reference numerals, and are not described again here in greater detail. FIG. 3 shows another variant for the accommodation of circuit elements in plug mounting 2. There is a substrate 7, as in the exemplary embodiment in FIG. 1, whose upper and lower sides are equipped with circuit elements 19. The substrate 7 is used, in this case, as contact surface for the spring elements 11 and 12, which establish the electrical contact between circuit elements 19, on substrate 7, and contact pins 3, 4 of the ignition element.

Further circuit elements 20, 21, for example in the form of SMD-components, are positioned in cut-outs 22 and 23 within plug mounting 2, between the circuit elements 20 and 21 and the other circuit elements 19 on substrate 7 and, beyond that, with contact pins 3 and 4 of the ignition element, electrical connection is established via at least one connecting pin 24 set into plug mounting 2. Connecting pin 24 does this by extending past a contact, e.g., of circuit elements 20 and ending at substrate 7, where it can be put in contact with a printed circuit trace by adhesion or soldering.

According to the exemplary embodiment in FIG. 3, connecting pin 24 is a pin projecting out of plug mounting 2, just like the other connecting pins 10 (already described in connection with FIG. 1). When this connecting pin 24 only serves the function of establishing electrical connection between circuit elements 20, 21 and 19 inside plug mounting 2, it then needs only to extend inside plug mounting 2, without extending outside plug mounting 2. Now if, as depicted in FIG. 3, connecting pin 24 is developed exactly the same as the other connecting pins 10, but, in contradistinction to connecting pins 10 is not supposed to make electrical connection with a connecting socket, this connecting pin 24 can be used as an anti-rotation element when inserting the ignition device into a connecting socket. For this, it is expedient to extrusion-coat the connecting pin 24 with an insulating plastic. The plastic extrusion coating of connecting pin 24 is performed at the same time as the plastic extrusion coating 25 of edge 18 of ignition capsule 1 with plug mounting 2 protruding from capsule 1.

What is claimed is:

1. An ignition mechanism for at least one restraining device in a vehicle, comprising:

at least one ignition element, the at least one ignition element including contact pins;

circuit elements for supplying power, and for at least one of activating and diagnosing the at least one ignition element;

a carrier arrangement on which the circuit elements are situated;

an ignition capsule to which the at least one ignition element and the contact pins are fixed;

a plug mounting in which the circuit elements are situated, the plug mounting being insertable in the ignition capsule; and spring elements for establishing contact between the circuit elements and the contact pins of the at least one ignition element when the plug mounting is set into the ignition capsule;

wherein an electrical connection between the circuit elements and the at least one ignition element is established by the contact pins of the at least one ignition element.

2. The ignition mechanism as recited in claim 1, wherein the carrier arrangement includes at least one substrate running transversely to the contact pins, the substrate having upper and lower sides equipped with circuit elements.

3. The ignition mechanism as recited in claim 1, further comprising:

connecting pins fixed in the plug mounting having first and second ends, the first end contacting the circuit elements and the second end extending out of the ignition mechanism for connection to an attachment plug.

4. The ignition mechanism as recited in claim 1, further comprising:

contact surfaces;

wherein the contact surfaces are situated on a side of a substrate facing the contact pins of the ignition mechanism, the contact surfaces accommodating the spring elements.

5. The ignition mechanism as recited in claim 1, wherein:

the plug mounting has at least one opening for receiving at least one circuit element, and at least one connecting pin set into the plug mounting establishes an electrical connection between the at least one circuit element and at least one further circuit element.

6. The ignition mechanism as recited in claim 5, wherein the at least one connecting pin extends outwards from the plug mounting, a part of the connecting pin extending out of the plug mounting being extrusion-coated with an insulating plastic, the at least one plastic extrusion-coated connecting pin being used as an anti-rotation element when inserting the ignition mechanism into a connecting plug.

* * * * *